United States Patent
Melick et al.

(10) Patent No.: US 7,070,103 B2
(45) Date of Patent: Jul. 4, 2006

(54) METHOD AND APPARATUS FOR BAR CODE DATA INTERCHANGE

(75) Inventors: Bruce D. Melick, Cedar Rapids, IA (US); David M. Snyder, Cedar Rapids, IA (US); Leslie D. Baych, Cedar Rapids, IA (US)

(73) Assignee: Tripletail Ventures, Inc., Cedar Rapids, IA (US)

( * ) Notice: Subject to any disclaimer, the term of this patent is extended or adjusted under 35 U.S.C. 154(b) by 0 days.

(21) Appl. No.: 09/753,863

(22) Filed: Jan. 3, 2001

(65) Prior Publication Data

US 2002/0195495 A1 Dec. 26, 2002

Related U.S. Application Data

(60) Provisional application No. 60/232,825, filed on Sep. 15, 2000, provisional application No. 60/213,843, filed on Jun. 23, 2000, provisional application No. 60/174,220, filed on Jan. 3, 2000.

(51) Int. Cl.
*G06K 7/10* (2006.01)

(52) U.S. Cl. .............................. 235/462.01; 235/472.01

(58) Field of Classification Search ................
235/462.01–462.45, 472.01, 472.02, 472.03,
235/454, 455, 375, 383, 381, 494, 380
See application file for complete search history.

(56) References Cited

U.S. PATENT DOCUMENTS

| | | | | |
|---|---|---|---|---|
| 5,379,345 A | * | 1/1995 | Greenberg | .................. 380/23 |
| 5,420,943 A | | 5/1995 | Mak | |
| 5,579,537 A | * | 11/1996 | Takahisa | ...................... 455/66 |
| 5,682,030 A | | 10/1997 | Kubon | |
| 5,805,152 A | * | 9/1998 | Furusawa | ................... 345/302 |
| 5,872,589 A | * | 2/1999 | Morales | ....................... 348/13 |
| 5,933,829 A | * | 8/1999 | Durst et al. | ................... 707/10 |
| 5,939,699 A | * | 8/1999 | Perttunen et al. | ....... 235/462.01 |
| 6,015,088 A | * | 1/2000 | Parker et al. | .......... 235/462.01 |
| 6,024,289 A | | 2/2000 | Ackley | |
| 6,036,094 A | | 3/2000 | Goldman et al. | |

(Continued)

FOREIGN PATENT DOCUMENTS

JP      40-6089362      *  3/1994

OTHER PUBLICATIONS

Product Profile: Hand Held Bar Code Scanner; Scan Plus 1800 by Intermec Technologies Corporation.
WelchAllyn Scanteam 3400 Series User's Guide, 1998.

*Primary Examiner*—Thien M. Le
(74) *Attorney, Agent, or Firm*—McKee, Voorhees & Sease, P.L.C.

(57) ABSTRACT

A new method and system for bar code data interchange includes a bar code scanner, such as a high scan rate LED scanner, and reads bar coded information from a video display. This bar coded information is scanned from the video display into a host device. The bar coded information may be sent to a user in a variety of ways, including over the Internet, any intranet, or any type of telephony network. The bar coded information may be viewed by the user on the video display as part of an e-mail message, as displayed on a web-page, or as displayed on television programming. The scanned bar coded information is decoded and may then be used. A first software program may have been used to create the bar coded information, and a second and distinct software application may be used with the now decoded bar coded information.

5 Claims, 5 Drawing Sheets

U.S. PATENT DOCUMENTS

| | | |
|---|---|---|
| 6,039,252 A | 3/2000 | Maltsev |
| 6,041,374 A | 3/2000 | Postman et al. |
| 6,082,620 A * | 7/2000 | Bone, Jr. ............... 235/462.16 |
| 6,149,059 A | 11/2000 | Ackley |
| 6,389,182 B1 * | 5/2002 | Ihara et al. ................. 382/309 |
| 2002/0023027 A1 | 2/2002 | Simonds |

* cited by examiner

METHOD AND APPARATUS FOR BAR CODE DATA INTERCHANGE

CROSS-REFERENCE TO RELATED APPLICATIONS

This application claims priority to U.S. Provisional Applications, Ser. No. 60/174,220 filed Jan. 3, 2000, 60/213,843 filed Jun. 23, 2000, and 60/232,825 filed Sep. 15, 2000, all of which are entitled METHOD AND APPARATUS FOR BAR CODE DATA INTERCHANGE and all of which are herein incorporated by reference.

BACKGROUND OF THE INVENTION

1. Field of the Invention

This invention relates generally to bar code technology, and more particularly to a method and apparatus for capturing bar code information from a variety of video displays as well as other media, and using this bar code information in a variety of applications.

2. Problems in the Art

The use of bar code technology has proliferated as a means for efficient data collection. Generally, bar code technology allows for numbers, characters, or other symbols to be coded into a series of one-dimensional (1D) or two-dimensional (2D) spaced bars, as those terms are commonly known in the art. These bars are currently printed on the surface of particular objects. A good description of various bar code symbologies can be found in U.S. Pat. No. 6,149,059 to Ackley, herein incorporated by reference. Currently a bar code scanner is used to capture the pattern on the object, associated software decodes the bar code pattern, and the information from the decoded bar code pattern may be used as data and acted upon accordingly. One current method of reading bar codes is given in U.S. Pat. No. 6,039,252 to Maltsev, and is herein incorporated by reference.

However, there are currently no known easy means for capturing bar code patterns from a wide variety of video displays. Current methods for capturing bar code data from a composite video signal requires specialized and sophisticated camera and computer equipment. The use of such specialized and sophisticated camera and computer equipment is both cumbersome and expensive. It is therefore desirable to provide a means for capturing bar code patterns from a wide variety of video displays which is easy to use and relatively inexpensive.

Current bar code scanners have been incorporated into a wide variety of devices. Bar code scanners can now be found incorporated into other devices, such as a computer mouse or a personal digital assistant. However, none of these current devices are capable of reading bar codes from a video display. It is therefore desirable to provide a variety of devices with a bar code scanner capable of reading bar codes from a video display.

Currently, there are several problems associated with reading and decoding video displayed bar codes. First, a video displayed bar code to the human eye appears to be static. In reality, the video displayed bar code is flickering on and off many times per second. Second, a typical bar code reader has a low scan rate of 30 to 100 scans per second, which is not synchronized with the flickering video displayed bar code. Third, each type of video display has its own flicker, or refresh rate. Computer cathode ray tubes (CRT) commonly refresh from 72 Hz to 85 Hz. Computer liquid crystal displays (LCD) commonly refresh at 60 Hz. Around the world there are different standards for television CRTs which commonly refresh at 50 Hz to 60 Hz. It would be expensive to create a device to synchronize the flicker, or refresh, rates of multiple types of video displays with the scan rates of bar code readers.

Most current bar code scanners simply do not scan fast enough to ensure that a pixelized bar code image can be captured from a wide variety of video displays currently in use. It is therefore desirable to have a bar code scanner which is capable of capturing a pixilated bar code image from a wide variety of video displays.

The limiting nature of current bar code scanners also makes it difficult to interchange data across different computer operating systems and/or computer software applications. Currently, sophisticated computer software such as IBM DBT, Oracle, Microsoft SQL Server, or other programs, commonly referred to as middleware, are required in computer to computer data interchange applications. This middleware is expensive and requires a trained computer programmer to establish and maintain the data transfer links. Furthermore, middleware is not flexible. As business trading partners and suppliers change, and/or the format of data storage is modified in a host computer, the service of a trained computer programmer are required to maintain the data interchange capabilities. It is therefore desirable to minimize the amount of middleware software required.

Bar codes are currently one type of middleware. Current technology allows off screen media or printed bar codes to be used as "switches" to launch Internet web pages, complete complex machinery initialization and setup, dial a telephone number, etc. As the world moves toward a paperless society, it is desirable to provide a method for reading bar code switches which may be viewed on a video display.

There is therefore an unfilled need for a method and apparatus which solves these and other problems. This invention has as its primary objective fulfillment of this need.

FEATURES OF THE INVENTION

The general feature of the present invention is the provision of a method and apparatus for bar code data interchange which overcomes the problems found in the prior art.

A further feature of the present invention is the provision of an improved method and apparatus for bar code data interchange which is capable of reading video displayed bar code information.

A further feature of the present invention is the provision of a method and apparatus for bar code data interchange capable of reading video displayed standardized bar code symbology.

Another feature of the present invention is the provision of an improved method and apparatus for bar code data interchange which is capable of reading video displayed proprietary bar code symbologies.

A still further feature of the present invention is the provision of a method and apparatus for bar code data interchange that includes a high scan rate LED reader as a stand alone device.

A further feature of the present invention is the provision of a method and apparatus for bar code data interchange that includes a high scan rate LED reader which is incorporated into a wide variety of devices.

A still further feature of the present invention is the provision of a method of bar code data interchange which minimizes the need for middleware.

Another feature of the present invention is the provision a method of bar code data interchange which allows for data to be exchanged between computers using different operating systems.

A further feature of the present invention is the provision of a method of bar code data interchange in which data may be exchanged between different computer software applications.

A further feature of the present invention is the provision of a method for bar code data interchange in which bar codes may be used as a "switch" to activate devices or links to other electronic documents such as, but not limited to, e-mail, Internet web pages, word processor documents, spreadsheets, databases, drawings, graphics, etc.

Another feature of the present invention is a method of bar code data interchange in which computer software is used to create bar codes within a video displayed document.

Another feature of the present invention is the provision of a method and apparatus for bar code data interchange which allows business-consumer transactions via video displayed bar codes.

Another feature of the present invention is the provision of a method and apparatus for bar code data interchange which allows business-business transactions via video displayed bar codes.

These, as well as other features and advantages of the present invention, will become apparent from the following specification and claims.

SUMMARY OF THE INVENTION

The present invention is directed to a method and apparatus for bar code data interchange. This apparatus is generally comprised of a bar code reader which is capable of scanning bar codes displayed on a variety of video displays, a decoder which transforms the scanned bar code into data which may then be manipulated in a variety of ways by a host device, such as a computer, personal digital assistant (PDA) or any other device in which bar code data input may be desirable.

In a preferred embodiment, a consumer will scan in bar code information from a video display, such as a television screen, through the use of a high scan rate LED scanner and obtain information on a desired product, a link to the product's web site, or other useful information. Businesses too, will scan in bar code information directly from video displays into their desired host device. This scanned information is not formatted specifically for any business software and therefore is easily transferable between businesses which may use different software applications to manipulate the same data to suit their needs. This minimizes the need for many of the conversion programs or interpretation programs, commonly known as middleware, and provides data interchange across a wide variety of settings for a myriad of purposes.

A more complete understanding of the method and apparatus for bar code data interchange will be afforded to those skilled in the art, as well as a realization of the additional features and advantages thereof, by a consideration of the following detailed description of the preferred embodiment. Reference will be made to the appended sheets of drawings which will first be described briefly.

DETAILED DESCRIPTION OF THE INVENTION

Figure 1:
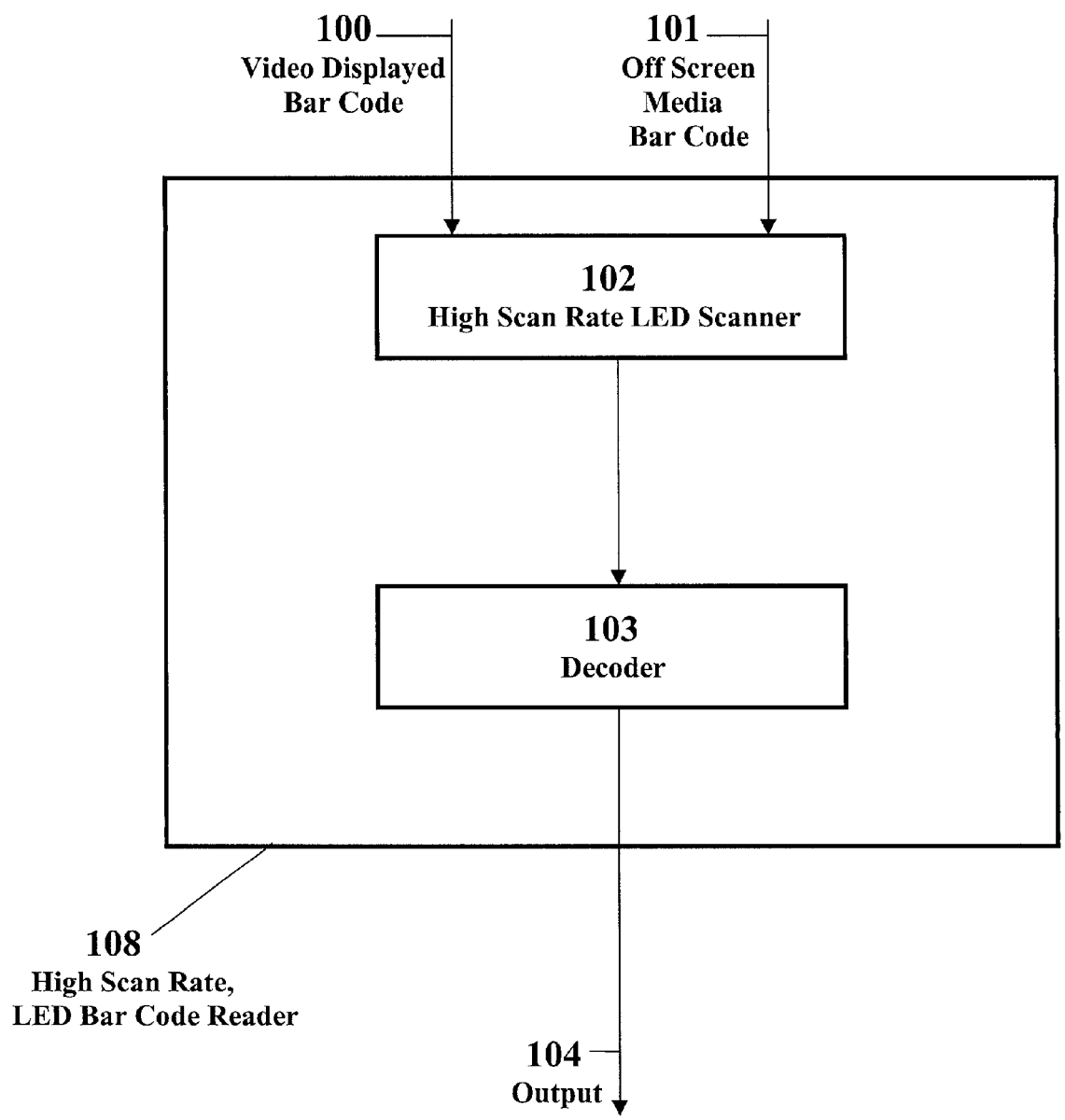
FIG. 1 is a block diagram depicting a stand alone bar code reader.

FIG. 1 is a block diagram that depicts the general configuration of one embodiment of the present invention. A general operating diagram of a typical stand alone bar code reader 108 which is capable of reading bar code information from a video display screen is shown. This type of bar code reader may be referred to as a video displayed bar code reader. Preferably the bar code reader 108 is a stand alone, high scan rate LED bar code reader 108. Preferably it is also hand manipulatable. This type of bar code reader 108 has two basic components, a high scan rate LED scanner 102 and decoder 103. The high scan rate LED scanner 102 captures video displayed 100 and/or off screen media (printed) 101 bar coded data. These video displayed bar codes 100 and/or off screen media bar codes 101 may be either standardized or proprietary bar code formats. Common standardized 1D and 2D bar code formats include Code 39, Code 128, Interleaved 2 of 5, PDF 417, etc.

The present invention captures video displayed bar codes 100 from sources such as, but not limited to, a digital TV screen, a CRT computer monitor, a liquid crystal display (LCD), a CRT TV screen, or off screen media bar codes 101.

High scan rate LED scanner 102 supplies output to decoder 103. The decoder 103 transforms the scanned bar code into useable electronic data as is commonly known in the art. The output of decoder 103 is supplied to another device, such as a computer for further processing via output 104. Output 104 may be transmitted to a universal serial bus (USB) connection, PCMCIA card connection, radio interface, or an infrared interface, etc.

Using a high scan rate LED bar code reader 108 allows a wide variety of video displayed bar codes to be read and decoded by increasing the number of bar code scans per second. A high scan rate LED bar code reader 108 can be a stand alone device as described in FIG. 1, or integrated into another device 200 as described in FIG. 2.

Figure 2:
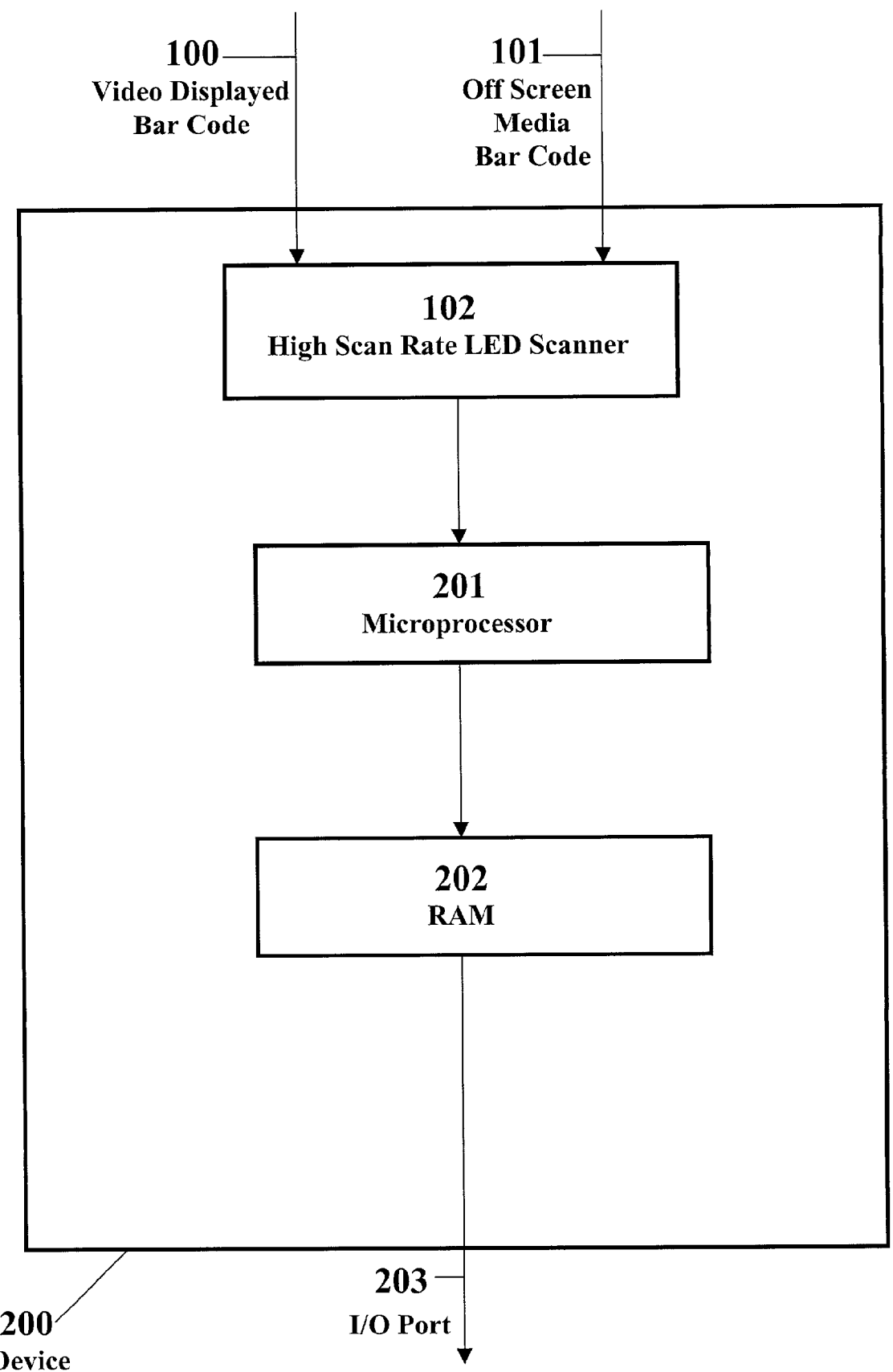
FIG. 2 is a block diagram depicting an integrated bar code reader.

FIG. 2 is a block diagram that depicts a preferred embodiment of the present invention which integrates a high scan rate LED bar code scanner 102 into device 200 using microprocessor 201 and random access memory (RAM) 202.

It will be readily understood by one skilled in the art that the present invention may be integrated into a device 200, such as a cell phone, a land line phone, PDA, computer mouse, GPS receiver, pager, a two-way communication device, a personal bar code reader known as a fob, etc.

A high scan rate LED bar code scanner 102 captures video displayed bar codes 100 and/or off screen media bar codes 101. These video displayed bar codes 100 and/or off screen media bar codes 101 may be either standardized or proprietary bar code formats. Common standardized 1D and 2D bar code formats include Code 39, Code 128, Interleaved 2 of 5, PDF 417, etc.

The preferred embodiment of the present invention captures and decodes video displayed bar codes 100 from sources such as, but not limited to, a digital TV screen, a CRT computer monitor, a liquid crystal display (LCD), a CRT TV screen, or off screen media bar codes 101.

The high scan rate LED bar code scanner 102 transmits signals to microprocessor 201. Microprocessor 201 in conjunction with random access memory (RAM) 202 can perform computing functions of device 200, and also transforms these signals into data. This data may be used for display by device 200, or may be transmitted to I/O port 203 to interface with another device such as a PC, PDA, GPS receiver, pager, a two-way communication device, a personal bar code reader known as a fob, etc. I/O port 203 may be a RS-232, PCMCIA slot, USB, infrared, proprietary, etc.

These video displayed bar codes 100 and/or off screen media bar codes 101 can also be used as switches to launch Internet web pages, dial a telephone number, complete complex machinery initialization and set-up, etc.

As an example, Motorola, Inc., Symbol Technologies, Inc., Connect Things, Inc. an affiliate of LM Ericsson AB, and AirClic, Inc. have created a unique registry of web codes, which are bar codes containing instructions for executing exact tasks. This enables wireless phones, cable TV set-top terminals, and other Internet-enabled appliances to access the Internet via current bar code scanning technology.

Bar codes, and web codes are printed on products, in publications including newspapers, brochures, and company advertisements, etc. By scanning a web code with a bar code-enabled Internet device, people will be connected directly to websites to order products, find information, and manage everyday tasks and transactions. As people scan web codes with these new Internet devices information will be sent instantly to a web code registry, which interprets the nature of the inquiry and delivers corresponding information to users. The information will include product-ordering links, promotional offers, downloads for music, product usage and service data, as well as links to other applicable Internet sites. Users will get transparent, universal access to products and services. The system supports "Internet-enhanced" standard UPC and EAN bar codes already positioned on millions of products worldwide.

The ability to display and read video displayed bar codes 100, which can be web codes, will greatly enhance the dynamic capabilities of the previously described system.

Figure 3:
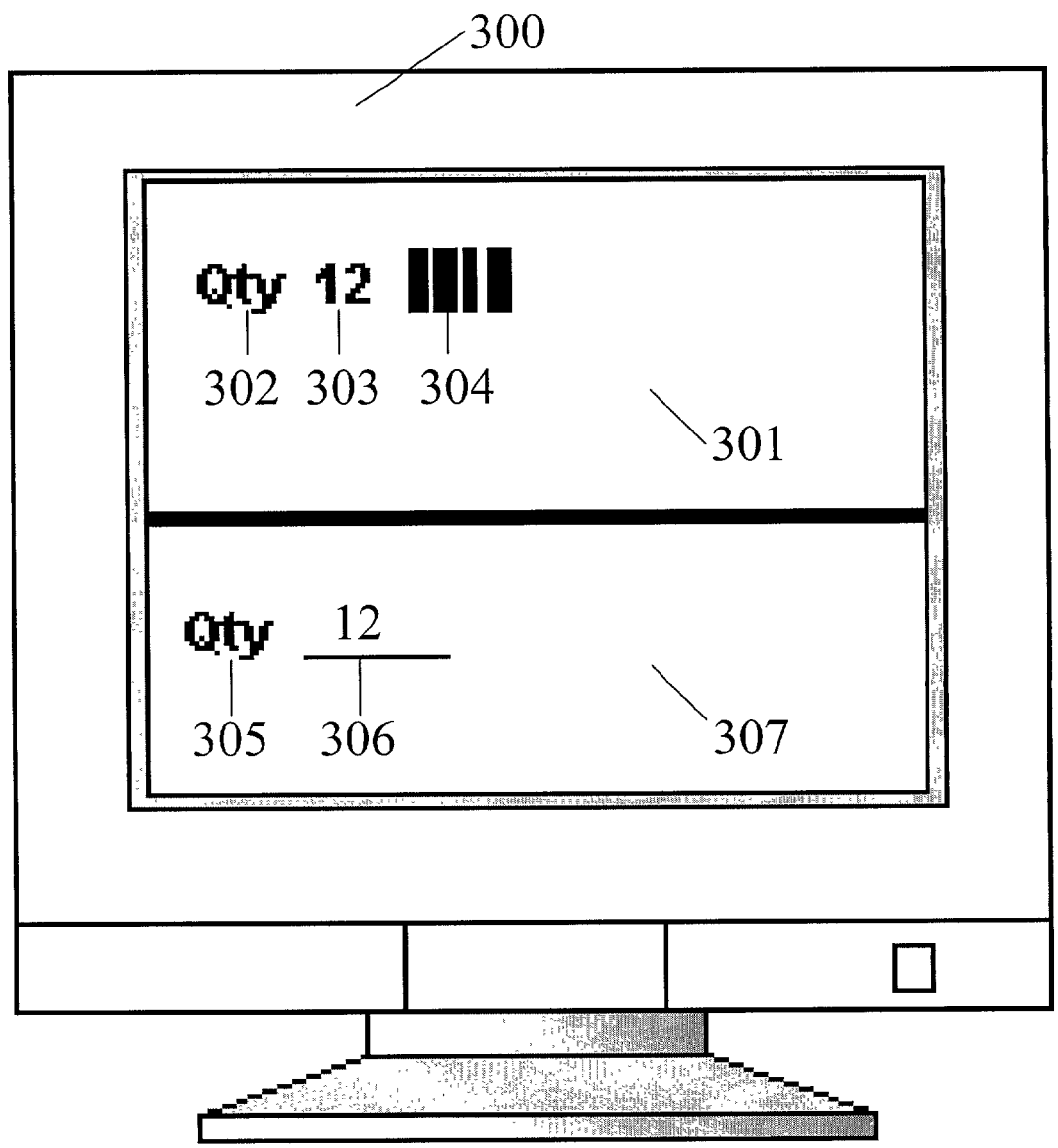
FIG. 3 represents an example of a bar coded document on a video display in a universal data interchange application.

FIG. 3 represents an electronic bar coded document on a computer window video display ready for data capture and interchange to an active computer window on the same computer screen.

Element 300 is a personal computer monitor. A personal computer monitor is shown, but this video display may be a laptop LCD screen, a personal digital assistant LCD screen, etc. Element 301 is an open window on personal computer monitor 300 displaying an electronic bar coded document. Element 307 is an active window on personal computer monitor 300 representing a software application in use on a business information system.

Element 302 is human readable information, such as "Qty" (the word "Quantity" abbreviated) shown. Element 303 is human readable information, the number "12". Element 304 is video displayed bar coded information representing the number "12".

Element 304 is captured and decoded from the computer monitor 300 using a high scan rate LED bar code reader 108 (shown in FIG. 1). This captured information is then output from the bar code reader 108 and input into the user's computer (not shown). The user's computer software accepts this input through a variety of commonly available software applications and the input is entered as the number "12" into element 306 which is a highlighted field in a business system information software application.

To illustrate one method of the bar code data interchange application of the present invention, Company A uses software such as MICROSOFT EXCEL on their PC to create an electronic document (i.e. a Purchase Order). This software creates documents that contain electronic representations of bar coded information through the use of bar code fonts which reside on the local computer and are commonly available today. The electronic Purchase Order is e-mailed to Company B, using MICROSOFT OUTLOOK software, as an example, in Standard Mail Transfer Protocol (SMTP) format across any variety of networks, such as the internet or an intranet. Optionally, the electronic bar coded document could reside on an Internet web page on a web server.

Company B opens their e-mail, which is in SMTP format using NETSCAPE MAIL software, as an example, to receive Company A's Purchase Order. Company B wishes to enter information from Company A's electronic Purchase Order into their own business information system. Company B will capture the video displayed bar codes directly from the e-mail displayed on their PC screen with a high scan rate, LED bar code reader, then exchanges that data into their own business system, using COREL PARADOX software, running in MICROSOFT WINDOWS operating system, as examples.

Referring again to FIG. 3, the field in the business information system, the "Qty" 302 in this example is highlighted. A bar code reader is pointed at the electronic bar coded "Qty" shown as 304 in the e-mail window, and inputs that data into the highlighted field 306 in the window running the business information system as the trigger on the bar code reader is squeezed.

If both Company A and B are using software on their PCs to create electronic documents that contain video displayed bar coded information, such as Code 39, Code 128, EAN, or UPC, they can do two-way data interchange without any sophisticated middleware. This system as it is designed is very flexible and allows any company, or person, with this software and high scan rate LED bar code reader to capture, decode, store, use, and interchange data with any other company, or person, operating this software. This system is easy to use, easy to install, and inexpensive to own and operate.

Another embodiment of the present invention allows the user to successively scan multiple bar codes identified with a field tag into a software application residing on the user's computer. In this embodiment, the field tags would be identified using the "function keys" F1, F2, F3, etc., on standard computer keyboards. This inputs the cached scanned data elements into the integrated software application one-at-a-time or as a group. The data tags are used as identification for inputting data into the correct fields in the integrated software applications. The integrated software strips the data tag from the data element so only the relevant data is input into the appropriate field.

As an example, two companies might agree to exchange data for various customers contained in their respective databases: first name, last name, and age. Using the appropriate "function key" to identify particular data elements, the two companies would agree the "function key" for first name data is F1, the "function key" for last name data is F2, and the "function key" tag for age data is F3. The software would be programmable on-the-fly to tag data fields with the appropriate "function key". The software would automatically tag the data elements from the database with the appropriate "function key" tag. The following chart is an example of this "function key" tagging.

| "Function key" Tag | (Data Field) Actual Data Element | Tagged Data Element (tagged data element in bar code form = "function key" + actual data element) |
|---|---|---|
| F1 | (First Name) JACK | F1JACK  |
| F2 | (Last Name) SMITH | F2SMITH  |
| F3 | (Age) 45 | F345  |

This embodiment of the present invention greatly reduces the number of transaction errors and greatly increase the speed of data interchange.

Data elements not identified by the same "function keys" could be used by multiple users, but this adds another step in the transaction process, and introduces the possibility of more input errors.

To illustrate another method of bar code data interchange, the present invention can use a variety of new standard e-mail interfaces and formats which include an expanded list of fields for data input, of which some fields may be available for video displayed bar codes. This expanded list of pre-defined data fields would allow easy transfer of data into integrated programs.

Figure 4:
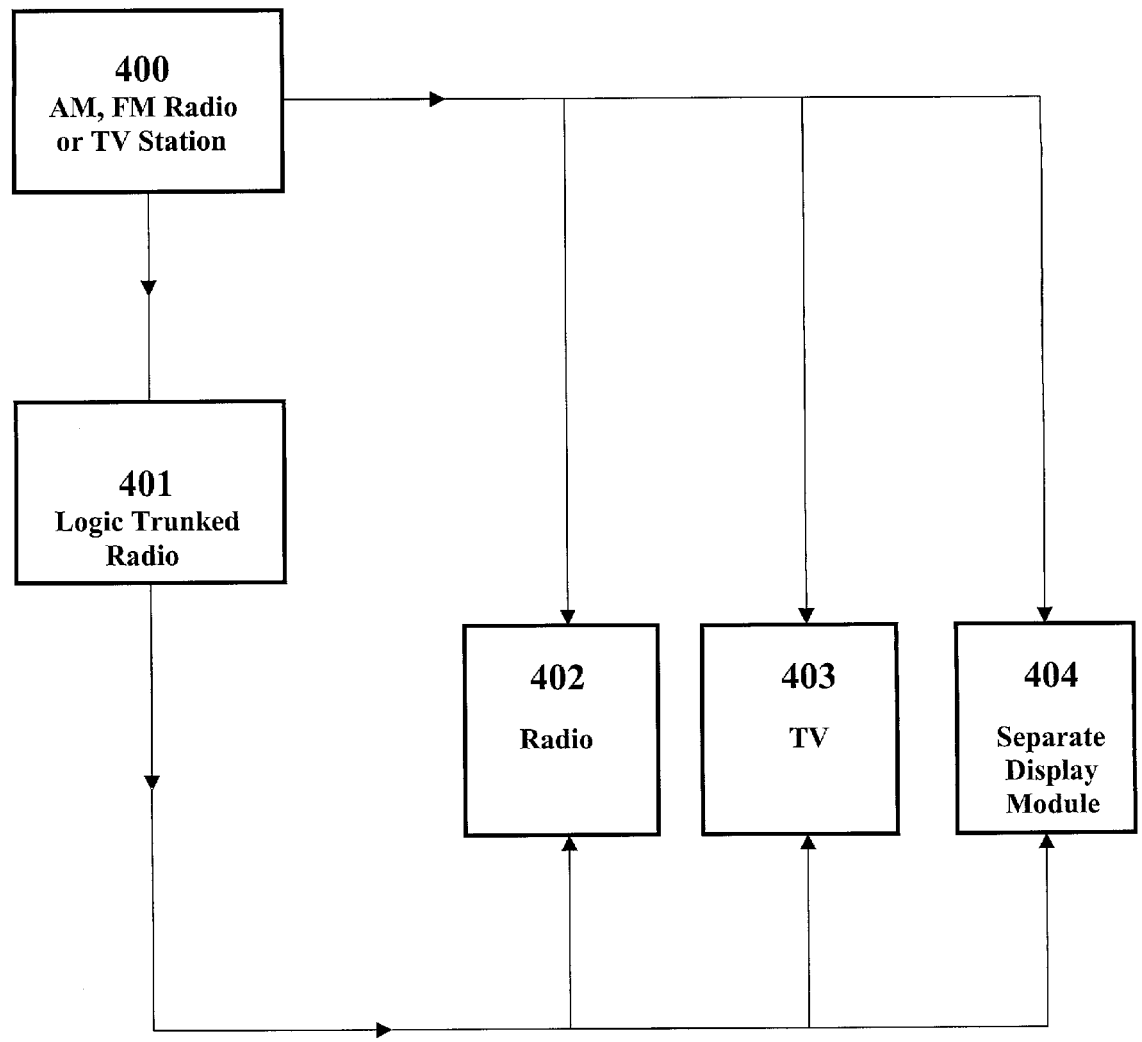
FIG. 4 is a block diagram showing video displayed bar codes synchronized with public radio and TV broadcasts.

FIG. 4 is a block diagram of the basic elements needed to synchronize video displayed bar codes with AM or FM radio station broadcasts, or TV station broadcasts.

Item 400 is an AM or FM radio station, or TV station broadcasting a variety of programs, music, and commercials. Radio or TV stations 400 have the ability to broadcast synchronized digital information simultaneously over logic trunked radio (LTR) 401, as an example. This digital information is then continuously converted to a video displayed bar code during the duration of the relevant program, music, or commercial by commonly available software. This video displayed bar code is displayed on a radio display 402, a TV 403, or a separate display module 404. As an example, during a commercial the video displayed bar code might represent a web address or phone number corresponding with the advertisement being broadcast. A user would capture, decode, and store video displayed bar coded data with a high scan rate LED bar code reader integrated into a cell phone, pager, key fob, etc., which may be used to dial a phone number, launch a web page, etc. now or at any desired time.

Figure 5:
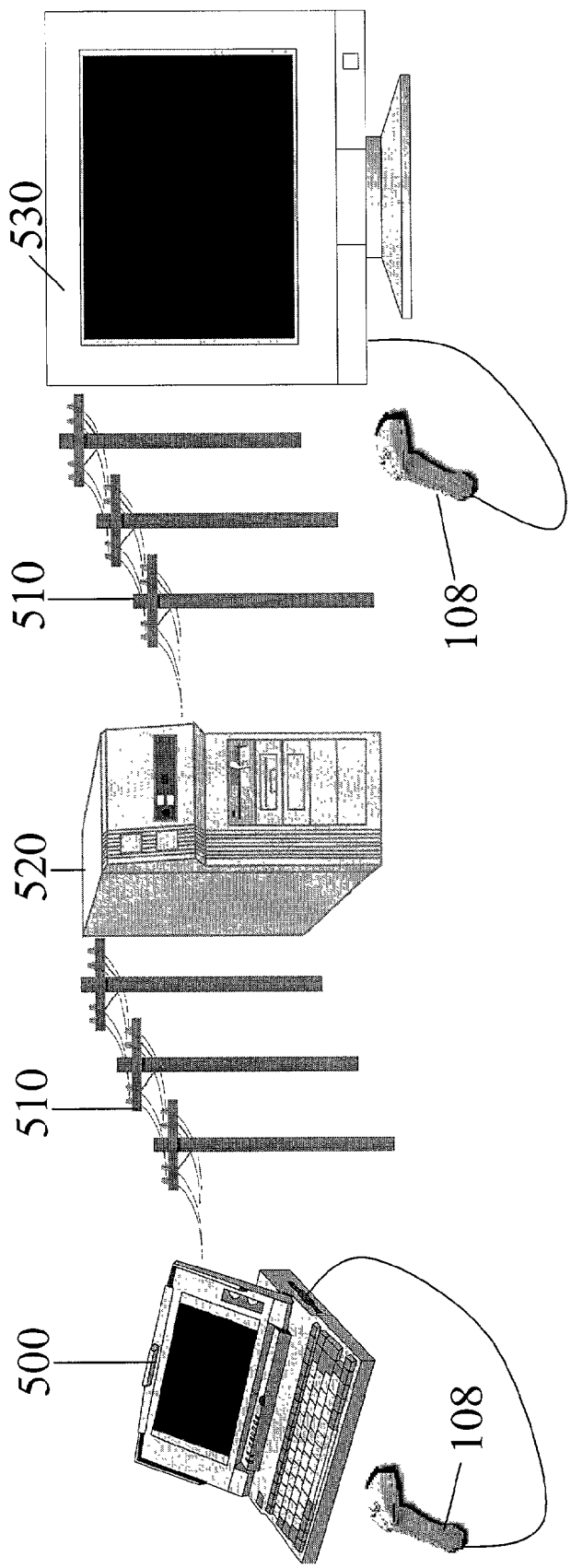
FIG. 5 is a diagram showing an example of the equipment used and data flow in a universal data interchange application of the present invention.

FIG. 5 represents the basic elements required in the present invention as part of a universal, business-to-business, data interchange system using video displayed bar codes 100 and/or off screen media bar codes 101 as shown in FIG. 1 and FIG. 2.

Laptop computer 500, may also be a personal computer, a personal digital assistant (PDA), etc. Laptop computer 500 is equipped with a high scan rate LED bar code reader 108 and the appropriate software commonly used with non-video display reading bar code readers. This software may be used and only requires that the high scan rate LED bar code reader 108 be appropriately set up by initializing it with a video displayed bar code rather than a printed bar code.

Personal computer 530, may also be a laptop computer, a personal digital assistant (PDA), etc. Personal computer 530 is equipped with a high scan rate LED bar code reader 108.

A high scan rate LED bar code reader 108, such as an Intermec ScanPlus 1800 series CCD reader or a Welch Allyn Model 3400HD, is shown connected to laptop computer 500 and another high scan rate LED bar code reader 108 is shown connected to personal computer 530. The bar code readers 108 are shown hardwired to the respective computers, but may be connected wirelessly via radio or infrared. A high scan rate LED bar code scanner 102 as shown in FIG. 2, may also be integrated into a device 200 as shown in FIG. 2 which may then either take the place of one of the computers 500 or 530 shown in FIG. 5 or operatively link thereto.

Laptop computer 500, is shown connected via a telephony network 510 to a computer server 520, which can be either an e-mail or web server. The telephony network 510 is shown as traditional, copper-based, hard-wire telephony medium, but also may be a combination of fiber-optic, or radio based telephony medium. The computer server 520 can be on the Internet, a wide area network (WAN), metropolitan area network (MAN), or a local area network (LAN).

Computer server 520, either an e-mail or web server is shown connected via a telephony network 510 to a personal computer 530.

Laptop computer 500 and personal computer 530 are loaded with software that creates electronic bar coded documents, using readily available, easy-to-use software such as, but not limited to, MICROSOFT WORD, MICROSOFT FRONTPAGE, MICROSOFT EXCEL, and ADOBE PAGEMILL, or customized integrated software applications. This greatly reduces, or eliminates the need for experienced programmers and expensive specialized middleware. This software is designed to automatically create bar coded data using either fonts (which may currently be installed or are included in some software applications) or graphics in electronic or printed documents.

Laptop computer 500 and personal computer 530 are loaded with software, such as any of the software previously mentioned, that creates an electronic bar coded document ready for transmission using an e-mail application such as, but not limited to, MICROSOFT OUTLOOK.

Since both laptop computer 500 and personal computer 530 are equipped with high scan rate LED bar code readers 108, and software that creates and transmits an electronic bar coded document, the system shown in FIG. 5 can capture, transmit, and interchange video displayed bar coded data across differing computer operating systems and/or software applications at point of data transaction.

In another embodiment of FIG. 5, in a personal-to-business transaction, laptop computer 500 can be equipped with a TV card. As an example, in a home shopping application, bar coded data is captured and decoded directly from the television CRT using a high scan rate LED bar code reader 108. This information is directly interchanged over the Internet with a representative from the shopping show. The high scan rate LED bar code reader 108 is also used to scan credit card information, and personal information from a driver's license to help automate this personal-to-business transaction.

The combination of access to the Internet, WANs, MANs, and LANs with video displayed bar codes will make it easy to develop centralized consumer and business applications that require variable information necessary to fill out forms, records, reports, etc. Some examples of these applications are as follows:

1) An enhanced electronic ticket generation system for law enforcement
2) An enhanced electronic reporting and grading system for school systems
3) An enhanced electronic billing and passport system for resorts, hotels, etc.
4) An enhanced electronic inventory system for insurance agencies to interact with homeowners and businesses
5) An enhanced electronic patient records and medication distribution system for hospitals, nursing homes, doctor's offices, dentists, etc.
6) An enhanced electronic system for automotive repairs, service & warranty work
7) An enhanced electronic shopping system to select merchandise from a printed catalog, wholesale or retail outlet, etc.

Having thus described a preferred embodiment and other embodiments of a method and apparatus for bar code data interchange, it should be apparent to those skilled in the art that certain advantages of the present invention have been achieved. It should also be appreciated that various modifications, adaptations, and alternatives may be made. It is of course not possible to describe every conceivable combination of components for purposes of describing the present invention. All such possible modifications are to be included within the spirit and scope of the present invention which is to be further defined by the following claims.

What is claimed is:

1. A method of using video displayed bar code data in bar code data interchange, the method comprising:
   creating an electronic document for data interchange using software, the electronic document comprising text and associated bar code data including the text;
   transmitting the electronic document to a computing device;
   displaying the electronic document on a video display associated with the computing device;
   scanning the bar code data from the video display;
   decoding the scanned bar code data into information;
   using the information to populate a data field and thereby complete the data interchange from the electronic document to the data field;
   wherein a first software application is executing on the computing device during the step of displaying and wherein the step of using the information is using the information within a second software application executing on the computing device.

2. The method of claim 1 wherein the first software application provides for displaying e-mail messages.

3. The method of claim 1 wherein the second software application provides for displaying e-mail messages.

4. The method of claim 1 wherein the first software application provides for displaying a web page.

5. The method of claim 1 wherein the second software application provides for displaying a web page.

* * * * *